No. 636,497. Patented Nov. 7, 1899.
J. DELATTRE.
APPARATUS FOR PURIFYING WASTE WATER.
(Application filed June 13, 1899.)
(No Model.)
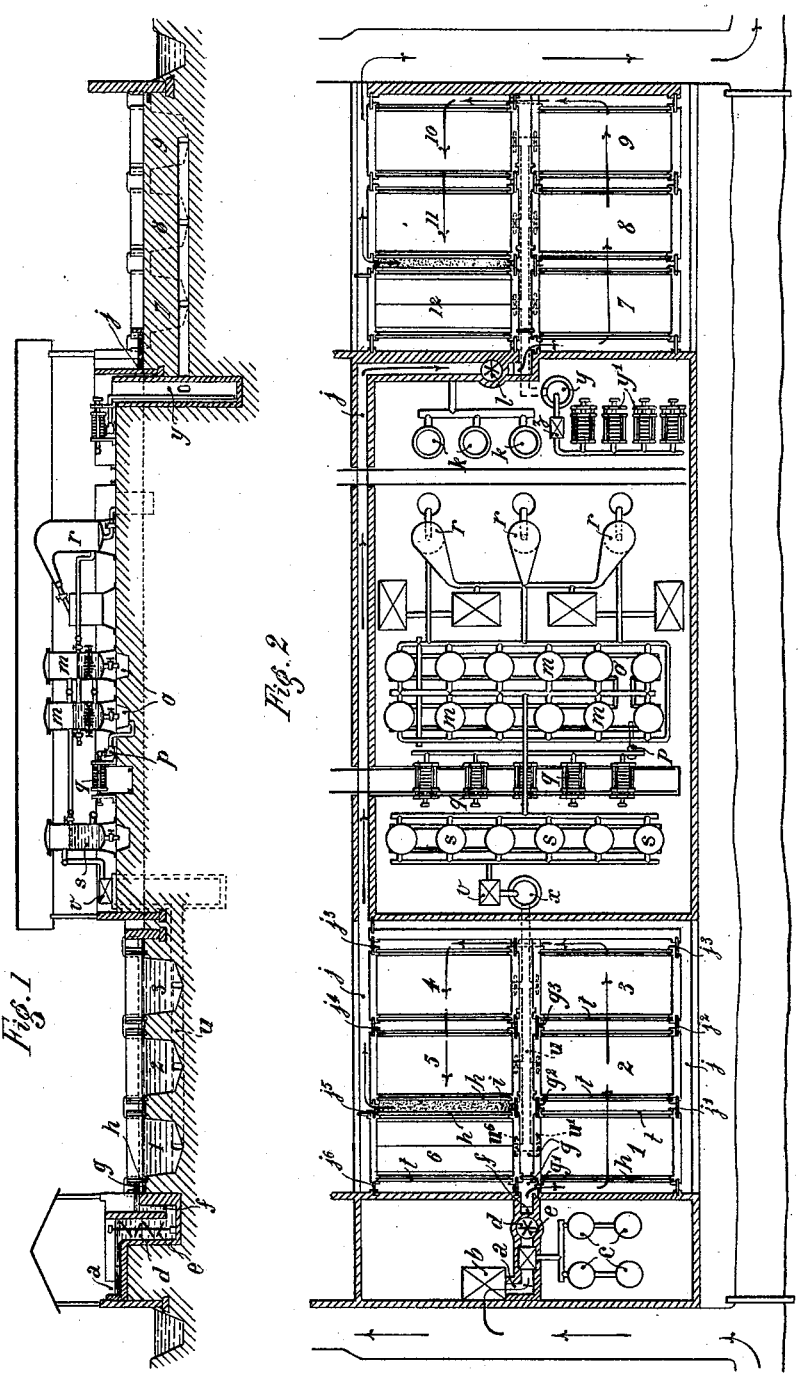
Witnesses:
Edward Vieser
George Barry Jr
Inventor:-
Jules Delattre
by attorneys
Brown & Seward

UNITED STATES PATENT OFFICE.

JULES DELATTRE, OF ROUBAIX, FRANCE.

APPARATUS FOR PURIFYING WASTE WATER.

SPECIFICATION forming part of Letters Patent No. 636,497, dated November 7, 1899.

Application filed June 13, 1899. Serial No. 720,400. (No model.)

*To all whom it may concern:*

Be it known that I, JULES DELATTRE, spinner, a citizen of the Republic of France, and a resident of Roubaix, France, have invented a new and useful Improvement in the Purification of Waste and Impure Waters, Particularly Such Waters as Contain Greasy Matters, of which the following is a specification.

My invention relates to an improvement in the purification of waste and impure waters, particularly such waters as contain greasy matters, like the residual water from wool-scouring and other industrial processes.

My invention can also be available for purifying water in rivers and streams which contains only a small quantity of greasy matters. It is, in fact, impossible to purify such water by means of the ordinary processes, which are made inefficient on account of said proportion, however small it may be, of greasy matters.

It consists in a combination of apparatus constituting an installation which effects the purification under the following conditions: The foul waters are first treated with sulphuric acid or other suitable acid or chemical equivalent under such conditions that an abundant deposit is precipitated, which contains the fatty matters and the impurities. This deposit in the state of slime is treated by a solvent of fatty matters, which carries off the latter, which are afterward separated by distillation. The slimes which remain after the removal of fatty matters are treated in a filter-press and thus form cakes which are employed as manure.

With regard to the waters acidified and separated from the deposit by decantation, they are neutralized by lime under such conditions that a second deposit is precipitated, which is treated in a filter-press, and thus brought to the state of cakes, which constitute a manure. The waters separated from the second deposit by decantation, and which are neutral or slightly alkaline, are thus completely purified and made without inconvenience to be run into the river.

The installation which I have devised for carrying out this method of treatment in the most favorable manner, both from the technical point of view and from the economical point of view, is represented, respectively in vertical section and in plan, in Figures 1 and 2 of the accompanying drawings. The water is directed to a channel $a$ by a pump $b$. In the first place, said pump causes a head of liquid which permits an overflow of a speed corresponding to the requirements during the whole process. In the second place, said pump insures a regular feeding of the water to be treated, so as to permit to obtain an economical and perfect working, especially as far as the acidifying is concerned. As soon as it leaves the pump the foul water is mixed in the channel with a certain amount of sulfuric acid supplied by the tanks $c$. This acid must reach the water in a well-divided state, which can be obtained, for instance, by means of perforated lead plates or pipes, so as to insure a perfect mixture. Besides, in order to complete the mixture the water arrives downward to a cylindrical receiver $d$, where it is stirred by an agitator $e$. It leaves the tank at the bottom and ascends in a vertical conduit $f$, wherefrom it overflows in a channel $g$. From this channel $g$ the acidified water passes into tanks, such as 1 2 3 4 5 6, where they settle, and which facilitate the deposit of all the matters which precipitate, drawing with them the fatty acids which have been set free. Said tanks are accordingly settling-tanks. The acidified water is admitted in the first settling-tank as a sheet which overflows along the total width of the tank. Owing to the considerable width of the sheet of water the speed is very slow, so that the deposit is left for the greater part in the first tank. The water then overflows in the next tank, and so on, issuing from the last tank nearly clear, but slightly acidulated.

The working of the tanks is methodical—that is to say, each of them serves successively as first or receiving tank for the acidified water. For this purpose the tanks are arranged in the following manner: The walls or partitions between them are provided at the top with grooves $t$, in which can be inserted removable planks $h$ of about two-thirds of a foot high, which act as overfalls. The channel $g$ is formed along one edge of the tanks and is provided in front of the partitions with gates $g'$ $g^2$ $g^3$. A delivery or exit channel $j$ is formed along the opposite edge of the tanks and is also provided with gates $j'$ $j^2$ in front of the partitions.

When it is desired to introduce water in the tank 1 and deliver it at the end of tank 5, the overfalls $h$ are placed as shown in Figs. 1 and 2—i. e., at the inlet of the tank 1 and at the outlet of the tank 5—and the gates $g'$ and $j^5$ are raised. The water then circulates as indicated by the arrows, and the slimes mixed with greasy matters settle in the tanks 1, 2, 3, 4, and 5. Meanwhile the slimes which were previously accumulated in the tank 6 descend into the well $x$ through the channel $u$, the gate $u^6$ being open. When the tank 1 is sufficiently filled with greasy slimes, it is isolated in order to evacuate said slimes into the well $x$ through the gate $u'$ and the channel $u$, and the tank 6 serves as last settling-tank. For this purpose the gates $u^6$ $g'$ $j^5$ are closed and planks, such as $h$, are introduced into the grooves in the partition between tanks 1 and 2, the plank on the side of tank 1 being a little higher than the plank on the side of tank 2. Besides, the planks $h$ between tanks 5 and 6 are taken away and one plank is placed on the left wall of tank 6. If the gates $g^2$ $j^6$ are then opened, the water arrives to the tank 2 and is delivered at the outlet of tank 6, and so on, the overfalls $h$ being always placed at the inlet of the first tank in work and at the outlet of the last tank and the overfalls of the intermediate tanks being taken away in order to allow the water to pass freely from one tank to another. As when leaving the last tank the water draws yet along some light particles, it passes through a filter $i$, which is constituted simply by placing wood fibers or any other suitable filtering material in the channel formed between the planks $h$, as clearly shown in Fig. 2. When leaving the filter $i$, the water passes in the channel $j$, where it receives a milk of lime, which is supplied from the cisterns $k$. The water then passes into a stirring apparatus $l$ and then into a series of tanks—such as 7, 8, 9, 10, 11, and 12—disposed exactly like the settling-tanks. This milk of lime is intended to neutralize the acidulated waters in the said tanks 7 to 12 before sending them to the river. As the acidity is very weak, the quantity of lime will be very small and the deposit will be little important. Accordingly the neutralizing-tanks may be less in number than the settling-tanks. Said neutralizing-tanks work exactly like the settling-tanks, with the same overflows, and filter at the outlet, and the mixing of the water with the milk of lime is done exactly like the mixing with the acid; but wood or other suitable pipes are substituted for lead pipes. From said tanks the water is sent to the river completely purified and neutralized.

The number of settling and neutralizing tanks may vary according to circumstances.

The deposits of acid slimes evacuated as aforesaid into the well $x$ are sent by means of a pump $v$ into an extracting-battery $m\,m$, where the grease is methodically taken off by means of a current of benzin. Bisulphide of carbon, alcohol, ether, oil of turpentine, or any other solvent of greasy matters may be used. It is to be remarked that in the extracting-battery the recovery of grease is effected upon liquid slimes and not upon greasy earthy matters previously pressed and dried. When the slimes are deprived of benzin, they are sent into a tank $o$, whence by means of a pump $p$ they are passed through filter-presses $q$, where they are formed into cakes which constitute an excellent manure. The benzin, saturated with grease, is passed through a distilling apparatus $r$, where it separates from the recuperated fatty matters.

In order to obtain in the extracting-battery a more effective working and to diminish the size of this battery instead of sending directly the greasy earthy matters from the settling-tanks 1 2 3 in the extracting-battery $m\,m$ it is advisable to send them first into a mixing apparatus $s$, where they are mixed with the solvent. When the mixing is accomplished, after a short rest a large quantity of the water separates from the greasy matters. It is then drawn off from the lower part of the mixing apparatus. What remains in the mixing apparatus $s$ is then sent to the extracting-battery $m\,m$.

The slimes deposited in the neutralizing-tanks are evacuated in a well $y$ exactly like the acid slimes are sent into the well $x$. The slimes are taken in the well $y$ by means of a pump $z$, which passes them through a battery of filter-presses $y'$, where they are formed into cakes which can be used as manure.

I claim—

In a plant for purifying waste or impure waters, the combination of a channel $a$ and means for supplying thereinto an acidifying agent, a pump $b$ for delivering into said channel the water to be purified, a stirring device $e$, a series of settling-tanks 1, 2, 3, 4, 5, 6, a filter $i$ placed at the outlet of the settling-tank which is for the time being the last of the series, a channel $j$ for the reception of the water from said tanks and means for supplying milk of lime to said channel, a mixing apparatus $l$, a series of neutralizing-tanks 7, 8, 9, 10, 11, 12, and an extracting-battery $m$ for recovering the grease from the slimes from the settling-tanks, the latter tanks being separated by means of partitions to which are fitted removable planks $h$ forming overfalls, all substantially as herein described.

In testimony that I claim the foregoing as my invention I have signed my name, in presence of two witnesses, this 2d day of June, 1899.

JULES DELATTRE.

Witnesses:
ALFRED C. HARRISON,
LOUIS L. ALEXANDRE.